United States Patent [19]

Corcoran et al.

[11] 4,388,171

[45] Jun. 14, 1983

[54] SUPERCRITICAL MULTICOMPONENT SOLVENT COAL EXTRACTION

[76] Inventors: James M. Beggs, Administrator of the National Aeronautics and Space Administration, with respect to an invention of William H. Corcoran, San Gabriel, Calif.; William S. Fong, Cambridge, Mass.; Puvin Pichaichanarong; Paul C. F. Chan, both of Pasadena, Calif.; Daniel D. Lawson, Arcadia, Calif.

[21] Appl. No.: 315,584

[22] Filed: Oct. 30, 1981

[51] Int. Cl.³ .......................... C10G 1/00; C10G 1/06
[52] U.S. Cl. .................................... 208/8 LE; 208/10
[58] Field of Search ............................. 208/8 LE, 10

[56] References Cited

U.S. PATENT DOCUMENTS

| | | | |
|---|---|---|---|
| 3,558,468 | 1/1971 | Wise | 208/8 LE |
| 3,607,716 | 9/1971 | Roach | 208/10 X |
| 3,607,717 | 9/1971 | Roach | 208/8 LE |
| 3,929,193 | 12/1975 | Duke | 208/8 LE X |
| 3,970,541 | 7/1976 | Williams et al. | 208/8 LE |
| 4,005,005 | 1/1977 | McCallum et al. | 208/11 LE |
| 4,036,731 | 7/1977 | Martin | 208/8 LE |
| 4,089,658 | 5/1978 | Bay | 208/8 LE X |

*Primary Examiner*—Delbert E. Gantz
*Assistant Examiner*—William G. Wright
*Attorney, Agent, or Firm*—Paul F. McCaul; John R. Manning; Thomas H. Jones

[57] ABSTRACT

The yield of organic extract from the supercritical extraction of coal with larger diameter organic solvents such as toluene is increased by use of a minor amount of from 0.1 to 10% by weight of a second solvent such as methanol having a molecular diameter significantly smaller than the average pore diameter of the coal.

14 Claims, 6 Drawing Figures

SUPERCRITICAL MULTICOMPONENT SOLVENT COAL EXTRACTION

ORIGIN OF THE INVENTION

The invention described herein was made in the performance of work under a NASA contract and is subject to the provisions of Section 305 of the National Aeronautics and Space Act of 1958, public law 83-568 (72 Statute 435; 42 U.S.C. 2454).

TECHNICAL FIELD

The present invention relates to the extraction of coal and, more particularly, to the solvent extraction of coal under supercritical conditions.

The U.S. reserve of coal is about 3 trillion tons. Although, the most abundant (80%) fossil fuel in America is coal, the U.S. consumption pattern is quite a reversal of form in terms of utilization, with coal representing only 17%, oil and gas about 78%.

The demand for all the fossil fuels combined is expected to double by the year 2000, even with increasing the use of nuclear power. While the domestic supply of crude oil and natural gas is not likely to keep pace with the energy demand, coal can play an important role in filling such a gap and thus reduce the requirements for imported supplies of oil and gas. A liquid extract of coal could be used as a synthetic petroleum and used to produce both liquid fuels and useful chemicals. The char remaining from the extraction of the coal could be used as a fuel for operation of stationary power plants.

BACKGROUND ART

Many coal liquefaction processes which are at an advanced stage of development operate in the liquid phase and are designed to produce both heavy liquids and solids at room temperature. In the case of liquefaction by extraction, the fluid phase is viscous, liquefied coal with some solid particles suspended in it.

Extraction of the organic matter in coal with supercritical solvents allows the upgrading of a fraction of the original coal into an organic having only a slight fraction of inorganic material.

The current state of the art is exemplified in the publication of R. R. Maddocks et al. in *Chemical Engineering Progress* (CEP), June, 1979 in pages 49–55. Maddocks et al. reported that the extraction of coal with supercritical toluene at 319° C. (606° F.) provide a 21-weight-percent yield of extract having a low ash content. It is further suggested that this process would be commercially attractive if yields of extract could be increased. Other studies have shown that the economics of coal extraction rapidly rise as the extraction and efficiency increases from 20 to 40%.

It would be expected that oral extraction efficiency under supercritical conditions increases with temperature. However, attempts to extract coal with efficient aromatic solvents such as toluene at temperatures above 400° C. actually result in lower yield of liquid extract due to gasification coking with perhaps some polymerization reactions to yield an increasing percentage of insoluble residue. Furthermore, more expensive materials of construction and an energy penalty are required for a high-temperature reactor and process. Other examples of low yield, supercritical solvent extraction processes are disclosed in U.S. Pat. Nos. 3,558,468 and 3,607,717 which illustrate the use of an aromatic solvent such as benzene at supercritical conditions. U.S. Pat. No. 3,607,716 utilizes phenanthrene to process liquid coal extracts under supercritical conditions, and U.S. Pat. No. 4,036,731 discloses a mixture of an aromatic solvent and a hydrogen donor solvent such as tetralin, preferably in the presence of hydrogen gas to extract coal under supercritical conditions.

DISCLOSURE OF THE INVENTION

An extensive study of process parameters and of the physical change in extracted coal has led to the discovery that the decrease in yield of supercritical extraction of coal with solvents with large second virial coefficients is due to the large size of the solvent molecule which prevents the molecule from moving freely through the small pore structure of coal. The process of supercritical extraction can be broken down into four steps as follows:

(1) Penetration of the coal-micropore structure by the solvent molecules.

(2) Depolymerization of larger molecular aggregates and the dissolution of the resulting products in the solvent;

(3) Breaking up of the resulting molecular bonds between the coal structure and the molecular species to be extracted; and (4) Diffusion of the extract and the fluid from the pore structure of the coal.

The more efficient solvation action of steps 2 and 3 by large solvent molecules is compromised by mass-transfer limitations of steps 1 and 4 which prevent penetration into and diffusion out of the coal.

It has now been discovered in accordance with the invention that the use of a binary-solvent system comprising a minor amount of a first solvent having a molecular diameter significantly smaller than the average pore diameter of the coal, in combination with a larger solvent molecule having good solvation properties for coal results in a substantial increase in the extraction efficiency at temperatures below the cross-linking and polymerization temperature of coal extracts. The very low extraction temperature of about 350° C. for the method of the invention greatly reduces the coking and other undesirable side reactions which tend to occur at an accelerated rate at temperatures above 400° C. Surface-area measurements of the extracted coal demonstrate the relationship of the molecular dimensions of the solvent molecules to the pore size of the coal. The supercritical extraction process of the invention results in improved mass transfer and increases in the apparent distribution coefficients for soluble extract material between the solid phase and the fluid phase. There is an improved equilibrium distribution of soluble material into the fluid phase, and the fluid phase in turn has sufficiently low density and viscosity so that it moves reasonably well through the pore structure of the coal.

These and many other features and attendant advantages of the invention will become apparent as the invention becomes better understood by reference to the following detailed description when considered in conjunction with the accompanying drawings.

DETAILED DESCRIPTION OF THE INVENTION

A supercritical-solvent-extraction technique has been developed in accordance with the invention which results in an increased separation of the organic matter in some coals into a substantially inorganic-free hydrocarbon extract. The coal is extracted by a supercritical fluid mixture comprised of a first solvent having a molecular diameter at least 50% smaller, preferably at least 75% smaller, than the average pore diameter of the coal to be extracted and a second solvent whose molecules are larger than those of the first solvent and which have greater extracting ability. For example, if a particular coal such as PSOC 190 has an average pore diameter of about 30 Angstroms, the first solvent could be selected to have a molecular diameter of no more than 15 Angstroms, preferably no more than 7.5 Angstroms. The first solvent allows initial penetration of the pores followed by the second solvent and its improved extracting ability.

It is to be understood that mixtures with more than two components could be of special interest in accordance with this invention.

The second solvent may also have a molecular diameter smaller than the pore diameter such as toluene which has a molecular diameter of about 10 Angstroms. The ability of both solvents to enter the pore structure is believed to result in stretching of the pores leading to fast and efficient penetration of the internal coal particle by the supercritical solvent mixture and to cause depolymerization and solvation of coal fragments.

It is also believed that the use of a mixture of polar and non-polar solvents such as methanol (polar) and toluene (non-polar) will facilitate dissolution of the coal since bituminous and sub-bituminous coals contain both polar and non-polar groups.

The coal extract has a very low ash content, a significantly reduced sulfur content, and is suitable for direct conversion into lower-viscosity, liquid-fuel products such as synthetic gasoline. During extraction in accordance with the invention, soluble structures of the coal transfer into the supercritical fluid mixture, leaving behind the inorganic materials. The solvent and coal extract can readily be recovered from the process system and the solvent can be recovered from the coal extract by fractional distillation.

The process of the invention is conducted under controlled conditions. The maximum extraction temperature preferably does not exceed about 450° C. in order to avoid coking and cross-linking. The minimum temperature during extraction should be above about 250° C. in order to have sufficient energy available to depolymerize the coal structure into fragments of lower molecular weight. The process is conducted at a pressure from about 500 to 10,000 psig, usually in the region of 1,500 to 5,000 psig to accomodate the nature of the fluids. The process is preferably operated just above supercritical conditions at a temperature and pressure within the stated range and usually within 200° C. and preferably within 100° C. of the critical temperature of the mixture, since at higher temperatures an unnecessary pressure and energy penalty results. It is believed that the highest efficiencies are achieved at 300° C. to 400° C. and pressures from 1,000 to 3,000 psig. The process can be operated below the critical temperature of the mixture.

The process of the invention is conducted by contacting the coal with solvent mixtures under supercritical conditions. Particles of coal may be suspended in solvent or the solvent can be passed through a fixed bed of particles. The amount of coal with respect to solvent is generally from 5% to 35% by weight, suitably from 10 to 20%.

Figure 1:
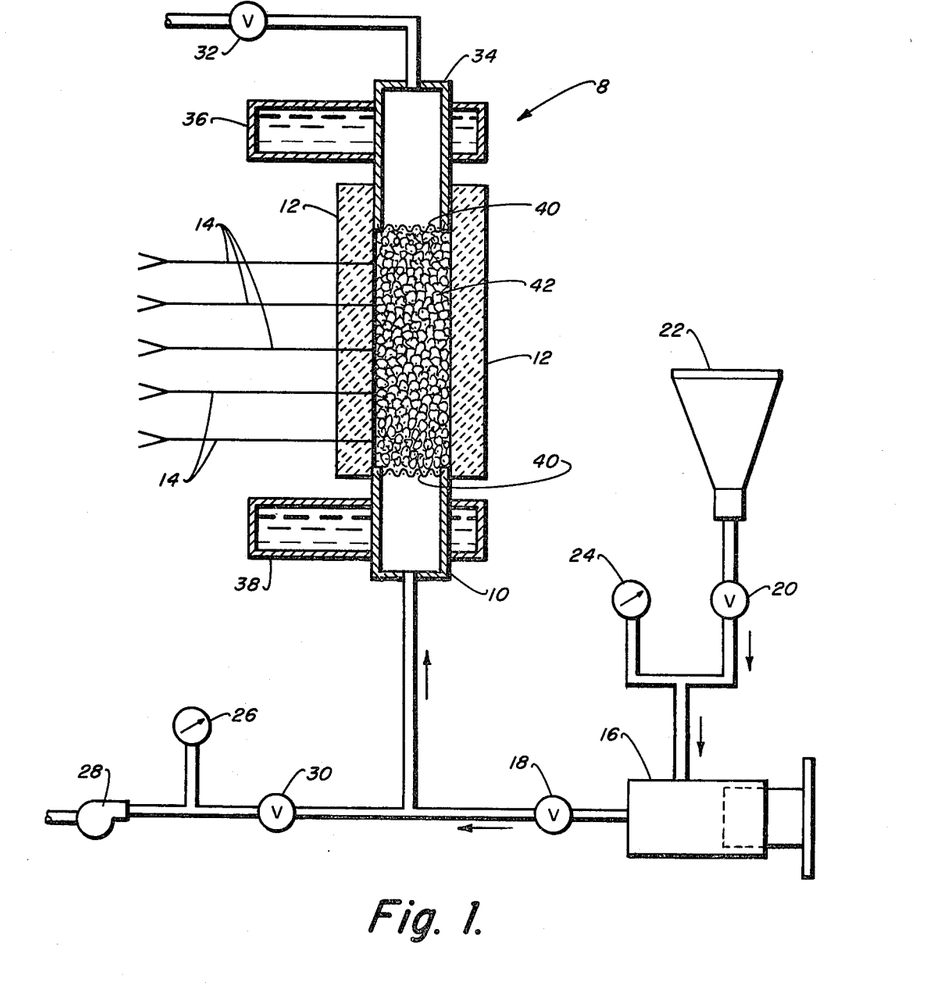
FIG. 1 is a schematic view of an experimental supercritical extraction apparatus for practicing the process of the invention.

Referring now to FIG. 1, the experimental apparatus 8 is in the form of a 0.376" O.D. and 0.285" I.D. 304 stainless steel tube 10. The tube was heated on the outside by a 800 W rectangular heater 12. Temperature was monitored by chromel-alumel thermocouples 14. A measured volume of solvent is fed from reservoir 22 to the cavity in hydraulic pump 16 by opening valve 20 and displacing the solvent with the plunger. Pressure is monitored on high pressure gauge 24. Gases are removed from the top 34 of the reactor 10 when valve 32 is open. To displace solvent in the tube into the reactor 10, a hydraulic pump 16 of 15 cm$^3$ volume was turned forward with valve 18 open and valve 20 closed. The coal used was an Illinois No. 6 high volatile C bituminous coal (PSOC 190) of 16–24 mesh size. A sample of 5.5 gm coal was supported in the tube 10 between two 325-mesh, stainless steel screens 40. Cold water was circulated through cooling elements 36,38.

Table 1 gives the ultimate composition on a dry basis.

TABLE 1

| Analysis of PSOC 190 Coal (Dried) (%) (Illinois No. 6 Bituminous) | |
|---|---|
| C | 70.4 |
| H | 4.99 |
| N | 1.36 |
| O | 7.75 |
| S | 2.86 |
| ASH | 12.6 |
| MOISTURE | 0.17 |
| VOLATILE | 36.7 |
| FIXED C | 55.3 |

Figure 2:
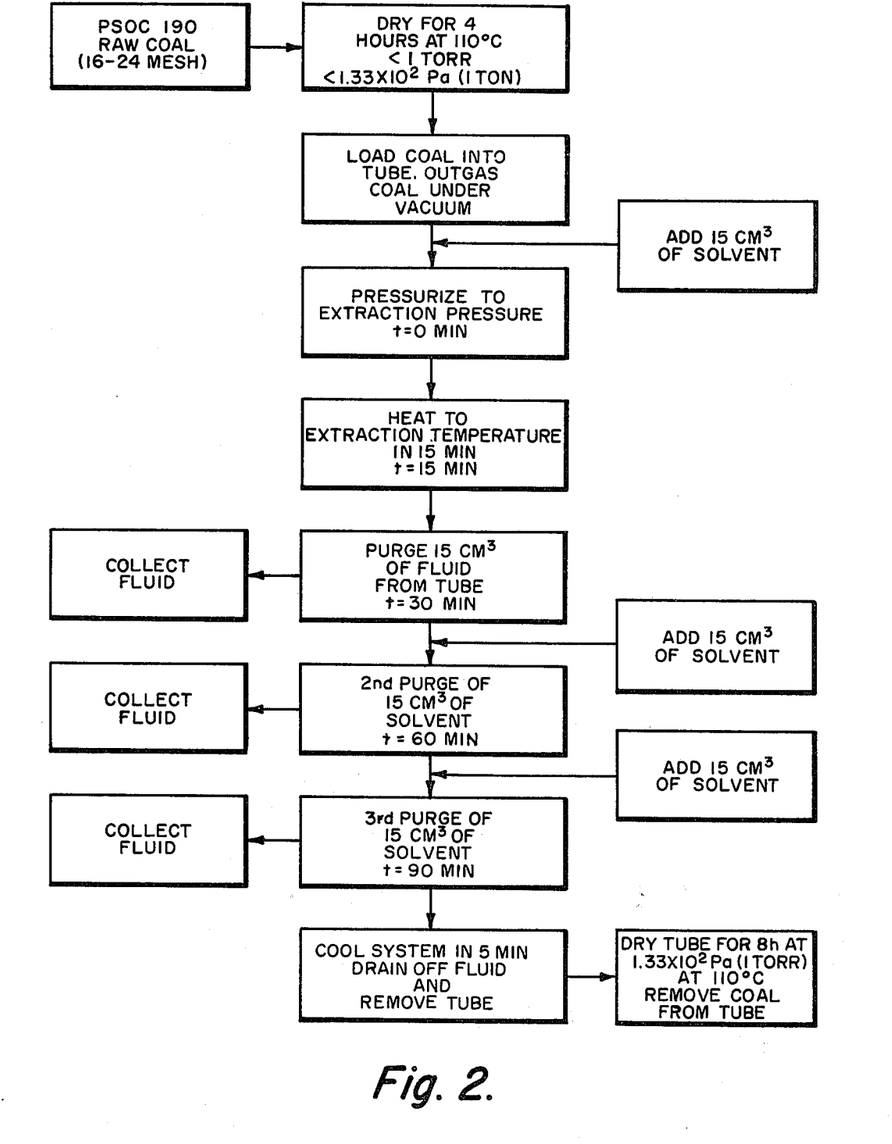
FIG. 2 is a flow chart for conducting supercritical coal extraction experiments in the apparatus of FIG. 1.
Figure 3:
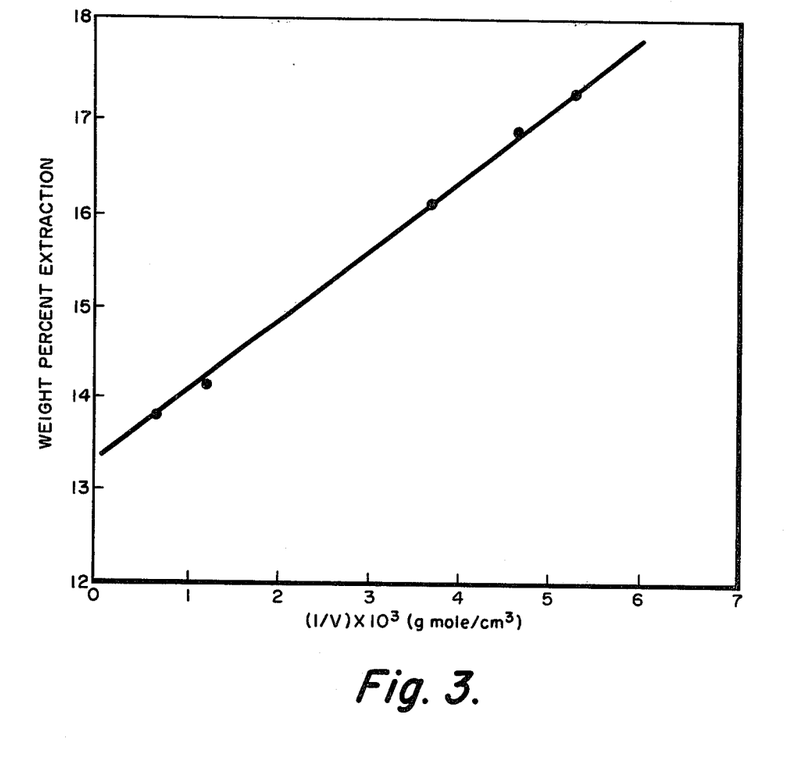
FIG. 3 is a graph relating to extraction with toluene at 365° C. and different pressures as represented by the inverse of molal volumes of solvent.

FIG. 2 shows the procedure used in the extraction. Experiments were conducted with 16 different solvents. Reagent-grade solvents were used and were outgassed to remove air. Coal was outgassed before adding solvent by means of vacuum pump 28, gauge 26 with valve 30 open. A heating time of 15 minutes was used, and the cooling time was 5 minutes for a total of 90 minutes for each experiment. The extraction time was established by experiment, and it was found that the 90-minute run provided reasonable equilibrium in the extraction yields. In the extraction a total of 45 cm$^3$ of solvent was introduced. An increase in the solvent-coal ratio by a factor of two did not yield any significant changes in extraction.

At the end of an experiment the whole tube was removed from the system and dried in a vacuum oven. The weight-per-cent of extraction was defined as:

weight-percent extraction =

$$\left[1 - \frac{\text{weight of extracted coal (dried)}}{\text{weight of raw coal (dried)}}\right] \times 100$$

Residence time for the solvent beyond a certain critical level was not significant. In one set of experiments with PSOC coal, extraction at 350° C. and 13.79×10⁶ Pa (2000 psig) with toluene, for example, gave an extraction of 16.8 weight percent for a 4-hour run and 16.4 weight percent for a 2-hour run. Temperature and pressure, however, were major factors in the percent extraction that was observed.

EXPERIMENTAL RESULTS

Effect of Temperature

The role of temperature in the extraction was examined by using toluene at a pressure of 13.79×10⁶ Pa (2000 psig) and at temperatures between 274° C. and 386° C. Table 2 is a tabulation of the results.

TABLE 2

Extraction of PSOC 190 Coal by Toluene at 13.79 × 10⁶ Pa (2000 psig) and Different Temperatures

| Temperature (°C.) | Weight Loss of Coal on Dry Basis (%) |
|---|---|
| 274 | 5.5 |
| 316 | 9.8 |
| 335 | 10.6 |
| 350 | 14.8 |
| 366 | 16.7 |
| 386 | 17.8 |

In going from 320° C. to 380° C., the amount of extraction doubled. Note should be made, however, that when the toluene was taken from a subcritical temperature past the critical temperature (320.6° C.) into the supercritical region, only gradual changes in extractability were observed. That suggested the increase in extraction might not be due to changes in density or viscosity of the supercritical fluid but rather to the thermal depolymerization accompanied by increased distribution of soluble compounds into the fluid phase.

Effect of Pressure

Toluene was also used to examine the effects of pressure in the extraction. Table 3 shows the results at 365° C.

TABLE 3

Extraction of PSOC Coal by Toluene at 365° C. and at Different Pressures

| Pressure Pa × 10⁻⁶ | psig | Weight Loss of Coal on Dry Basis (%) |
|---|---|---|
| 2.758 | 400 | 13.8 |
| 4.137 | 600 | 14.1 |
| 6.894 | 1000 | 16.1 |
| 9.653 | 1400 | 16.8 |
| 13.790 | 2000 | 17.2 |

Figure 4:
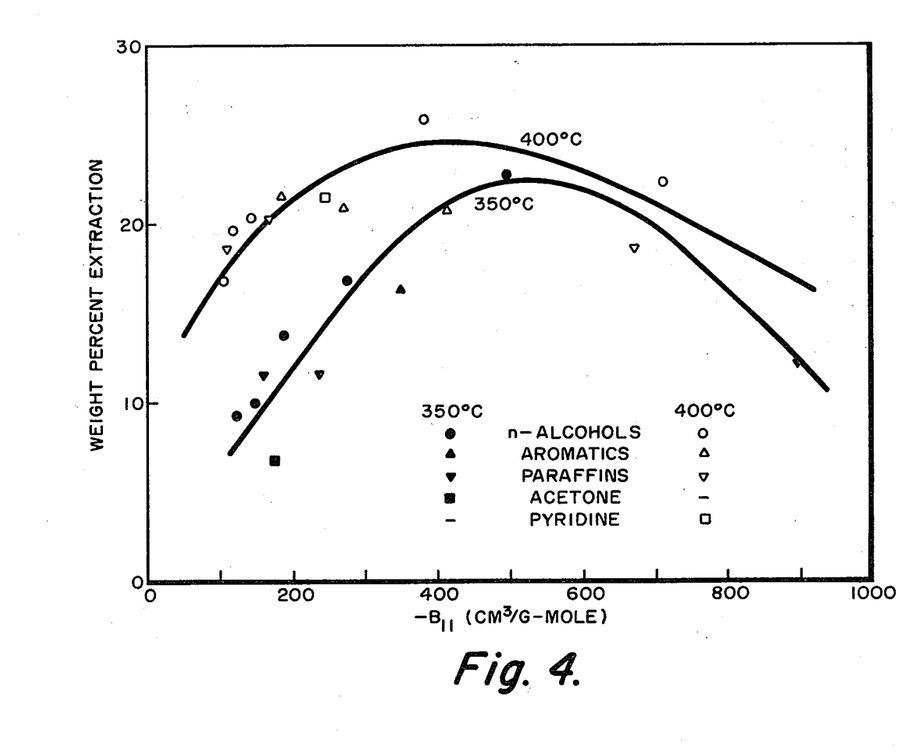
FIG. 4 is a set of graphs showing extraction of coal as a function of the second virial coefficient of the solvents.

The critical pressure of toluene is 4.216×10⁶ Pa (611.5 psi), and so the pressure was varied from below the critical region up to 13.79×10⁶ Pa (2000 psig). As the pressure was increased, there was a slight increase in extraction. FIG. 4 gives a plot of the data with the inverse of the molal volume of the mixture of solvent and extract, 1/V, as the measure of pressure.

At 365° C. and 13.79×10⁶ Pa (2000 psig), m-cresol extracted 26.8% of the PSOC 190 coal. Toluene for the same conditions extracted 17.2% and methanol 8.7%. With the assumption that the depolymerization of the coal itself is basically a temperature function, then the experiments with temperature and pressure show that a major consideration in extraction is the nature of the distribution coefficient of a given compound between coal and the extracting fluid. The next step, then, in the sequence of study was to consider the thermodynamics of the phase equilibria between coal and the extracting fluid for given temperatures, pressures, and extracting fluids.

Phase Equilibria

A reasonable treatment of phase equilibria for coal relative to an extracting fluid is possible if an assumption is made that coal may be treated as one single compound and if critical properties can be assigned to the vapor of that compound. Just for purposes of analysis and thought, anthracene was chosen as a model coal compound, and its solubility in toluene was calculated. At 13.79×10⁶ Pa (2000 psig) and 335° C., the method by Prausnitz (1969) with third virial coefficients taken into account gave a value of 5.4% for the solubility of anthracene in toluene compared to a 10.6% solubility for coal in toluene as noted in Table 2.

In order to correlate the data in the present analysis an approximate method was used. By equating the chemical potential of a pure solid designated as component 2 to the chemical potential of its vapor in the presence of a compressed fluid designated as component 1, a simple expression results if the virial equation of state of the supercritical fluid is approximated through the second term of the virial equation and if the vapor concentration of component 2 is small (Rowlinson and Richardson, 1959). The resulting expression is given as follows:

$$\ln(C_2/C_{2o}) = (V_S - 2B_{12})/V \quad (1)$$

Here $C_2/C_{2o}$ is a ratio of concentration $C_2$ of the vapor of component 2 in the presence of the compressed extracting fluid, and $C_{2o}$ is its concentration in the absence of the compressed fluid, all at the same temperature. $V_s$ is the molal volume of the solid. $B_{12}$ is the interaction second virial coefficient, and V is the molal volume of the mixture. Although the resulting analysis is only approximate, it provides an opportunity to correlate extraction of a substance like coal through interaction with a solvent molecule. $B_{12}$ is a measure of the Lennard-Jones potential $T_{12}$, between molecules 1 and 2. For spherical molecules, the interaction second virial coefficient is:

$$B_{ij} = -\tfrac{2}{3}\pi N_o\left(\frac{\sigma_i+\sigma_j}{2}\right) \quad (2)$$

where $N_o$ is the Avogadro number, and $\sigma_i$ and $\sigma_j$ are Lennard-Jones' parameters. A larger molecule will have a deeper potential well and hence will interact more strongly with other molecules. It will also then show a more negative value of $B_{ij}$. In reference back to Equation (1) it may be seen that a more negative value of $B_{12}$ implies a higher value of $C_2/C_{2o}$. That result agrees with the molecular relationships. If another approximation is made that $$B_{12} = \tfrac{1}{2}(B_{11} + B_{22}) \quad (3)$$

then Equation (1) would have the form:

$$\ln\left(\frac{C_2}{C_{2o}}\right) = \frac{(V_s - B_{22}) - B_{11}}{V} \quad (4)$$

Use of Equation (4) allows two observations to be made relative to extraction of coal. First, the extraction by any supercritical solvent will increase if V decreases which would be the same as increasing the pressure. The second point is that for the same value of V, a solvent with a more negative value of $B_{11}$, can extract more material. FIG. 4 shows the extraction by toluene as a function of 1/V at 365° C. Because the concentration of the vapor of component 2 is small, the molal volume of the total fluid, V, is equal to $V_1$, the molal volume of the solvent. For the range of pressures studied, the correlation gives a straight line.

The discussion above indicates that correlations can be made between the second virial coefficients of solvents with the amount of material extracted. Table 4 gives extraction results for various solvents at 250° C., 350° C., and 400° C., respectively. In establishing the virial coefficients for comparison with experiment, the method by Tarakad and Danner (1977) was used. For some solvents, excluding those in Table 5, their correlation of the acentric factor to find the radius of gyration was used.

FIG. 4 shows the plot of percent extraction as a function of $-B_{11}$ calculated by the techniques of Tarakad and Danner (1977). For lower values of $-B_{11}$ the curves are more or less straight lines. A maximum is reached and then the extraction decreases at higher values of $-B_{11}$. It is believed that for solvents with large values of $-B_{11}$, they could, in principle, dissolve larger amounts of coal, but their size prevents them from moving through the pore structure. Consistent with the four steps of supercritical extraction, Table 5 shows that 1-octanol, for example, extracts less than 1-hexanol probably because of the relative size of the molecules. A similar result was developed in a comparison between hexane and decane. For very large molecules, step 1 in the four steps cannot be effected.

Figure 5:
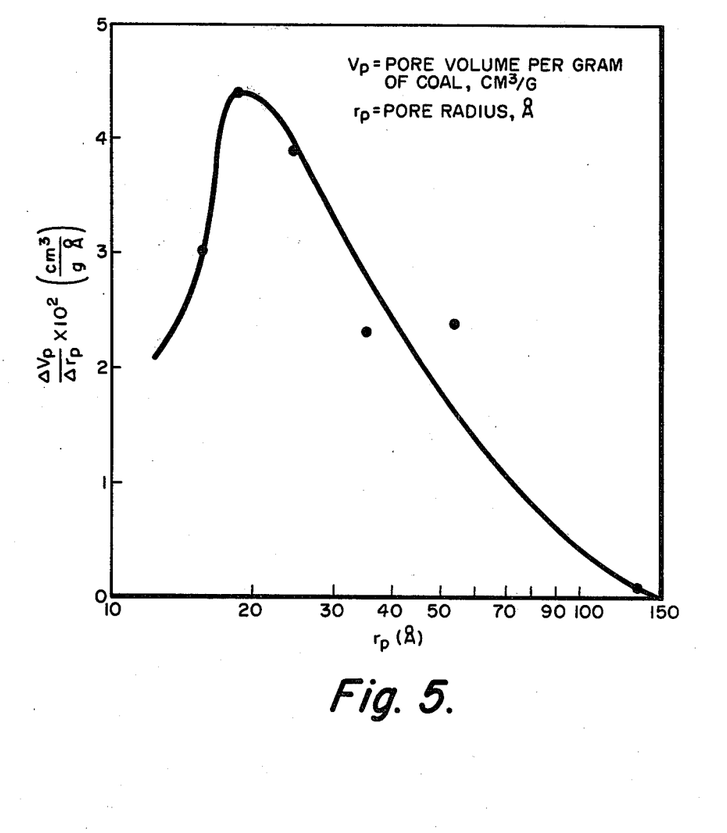
FIG. 5 is a graph of pore-size distribution of PSOC 190 coal.

The concept of molecular size and shape needs to be examined relative to pore-size distribution. For the PSOC 190 coal that was used, the pore-size distribution is shown in FIG. 5. The average pore diameter was found to be 31 Å. In measurements on another Illinois Number 6 high-volatile, bituminous coal it was observed that 30.2% of the pore volume was smaller than 12 Å; 52.6% was between 12 Å and 300 Å; and 17.2% was above 300 Å (Gan, Nandi, and Walker, 1972). Examination of the longest dimension of each solvent molecule is worthwhile. The length of n-heptane is 9.5 Å, that of 1 octanol about 11 Å, and that of naphthalene about 7 Å. These dimensions are comparable to the average pore diameter. Benzene, methanol, and ethanol are not larger than 4.5 Å. It is apparent that penetration of the micropore structure of the coal can be achieved more easily by the smaller molecules.

Surface Area of Extracted Coal

Table 5 shows the resulting apparent surface area of coal after extraction by various solvents in the present experiments.

TABLE 5

Surface Area (m²/g) of Residual PSOC 190 Coal After Extraction at 11.03 × 10⁶ Pa (1600 psig) (Measured by H₂ Adsorption)

| Solvent | 350° C. | 400° C. |
| --- | --- | --- |
| Untreated raw coal | | 45.0 |
| methanol | 0.219 | 0.228 |
| ethanol | 0.202 | 0.459 |
| 1-propanol | 0.207 | |
| 1-hexanol | 0.482 | 0.542 |
| 1-octanol | | 0.658 |
| acetone | 0.273 | |
| toluene | 1.16 | 1.46 |
| benzene | | 1.03 |
| xylene | | 1.12 |
| pentane | 0.445 | |

The areas were established by the single-point-BET method using nitrogen absorption. Note is made that the surface area was decreased by about 97% for aromatic solvents to 99.5% for alcohols. It was shown that coal extracted with smaller molecules showed smaller apparent surface areas at the end of extraction and that coal extracted at higher temperatures showed larger areas. The large decrease in surface areas probably results from the retention of extract in the pores. Upon removal of the fluid at the end of an extraction cycle, the relative volatility of the light alcohols, for example, is greater than that of heavy fluids, and so they could more readily leave the pores than the heavy fluids. They would leave condensed extract in the pores with resulting blockage. At higher temperatures, a heavier fluid in the pores could volatilize at a reasonable rate and leave larger surface areas as observed.

Use of Two-Component Solvents

Figure 6:
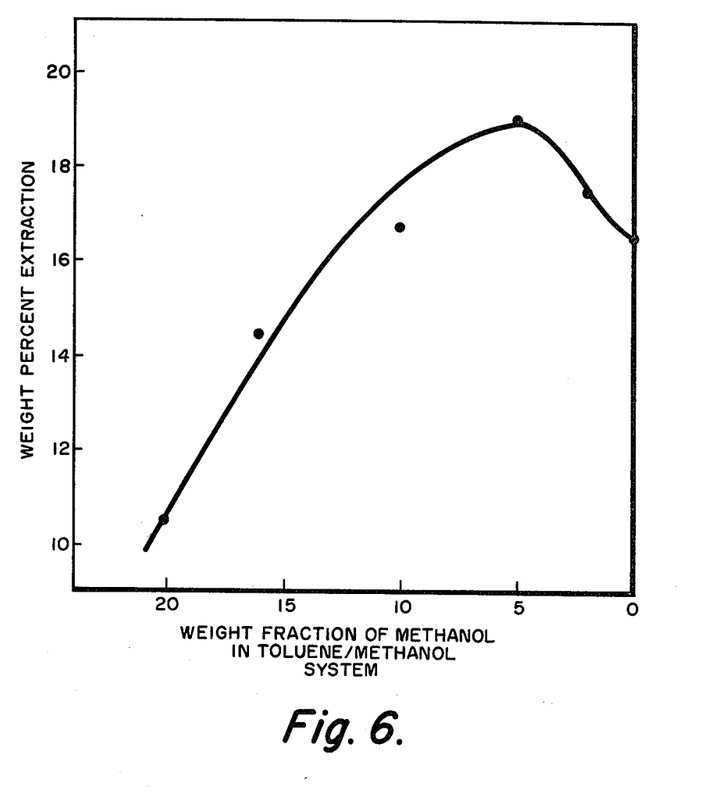
FIG. 6 shows the effect of mixed solvents on extract yield in the supercritical-solvent-extraction process of the invention.

The observations previously expressed about the relative size of fluid molecules and of pores in the coal structure resulted in the conception that larger solvent molecules could be mixed with smaller molecules in order to optimize extraction yield. Increased extraction in a methanol-toluene solvent pair as shown in FIG. 6 and tabulated in Table 6. A peak in the weight percent extraction is shown at about 5 weight percent methanol in the toluene-methanol system.

TABLE 6

Extraction with a Toluene/Methanol Mixture at 360° C. and 13.79 × 10⁶ Pa (2000 psig)

| Volume Ratio, Methanol/Toluene (at room temperature) | Weight Loss of Coal (%) |
| --- | --- |
| 0/100 | 16.4 |
| 2/98 | 17.4 |
| 5/95 | 19.0 |
| 10/90 | 16.6 |
| 16/84 | 14.4 |
| 20/80 | 10.5 |

A systematic approach to solvent extraction of coal is possible by consideration of correlations using second virial coefficients. The resulting maxima in extraction at a given pressure for various temperatures and values of the second virial coefficient are explained by solvent size.

Increased extraction performance has already been demonstrated by the methanol-toluene system as shown in FIG. 6. Other binary systems such as naphthalene-carbon dioxide should also achieve higher extraction.

It is to be realized that only preferred embodiments of the invention have been described and that numerous substitutions, modifications and alterations are permissible without departing from the spirit and scope of the invention as defined in the following claims.

We claim:

1. A method of separating an organic extract from coal comprising the steps of:
   - adding particulate coal and a mixture consisting essentially of a first solvent and a second solvent; said first solvent being present in the solvent mixture in an amount from 0.1 to 20% by weight and having a molecular diameter at least 50% smaller than the average pore diameter of the coal and said second solvent having a larger molecular diameter than the first solvent and being an efficient coal-extracting solvent;
   - heating the reactor to a temperature above the critical temperature for the solvent mixture but below 450° C. at a pressure of 500 to 10,000 psig to supercritical fluid form;
   - extracting organic coal components into the supercritical fluid phase; and
   - removing said phase from the reactor.

2. A method according to claim 1 in which the first solvent is present in the mixture in an amount less than 5% by weight.

3. A method according to claim 2 in which the average pore diameter of the coal is from 5 to 100 Angstroms.

4. A method according to claim 3 in which the average pore diameter is from 10 to 40 Angstroms.

5. A method according to claim 2 in which the second solvent has a molecular diameter smaller than the pore diameter.

6. A method according to claim 5 in which one of said solvents is polar and the other non-polar.

7. A method according to claim 1 in which the first solvent is selected from lower-molecular-weight alcohols or ketones.

8. A method according to claim 7 in which the second solvent is an aromatic compound containing 1 to 3 rings.

9. A method according to claim 8 in which the second solvent is toluene.

10. A method according to claim 9 in which the first solvent is methanol.

11. A method according to claim 10 in which no more than 5% by weight of methanol is present.

12. A method according to claim 1 which the extraction temperature is from 200° C. to 400° C. and the pressure is from 1000 to 5000 psig.

13. A method according to claim 1 in which the coal is bituminous.

14. A method according to claim 13 in which the coal is present in an amount of 5 to 35% by weight with respect to solvent.

* * * * *